Jan. 9, 1923.
P. H. DAVIS.
CONVEYER BELT FOR DISHWASHING AND LIKE MACHINES.
FILED JULY 28, 1922.
1,441,836.
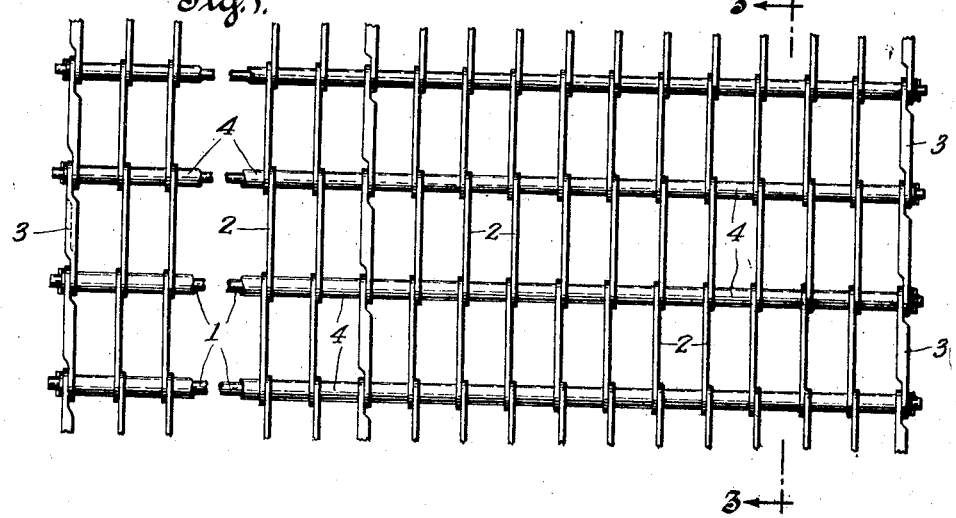
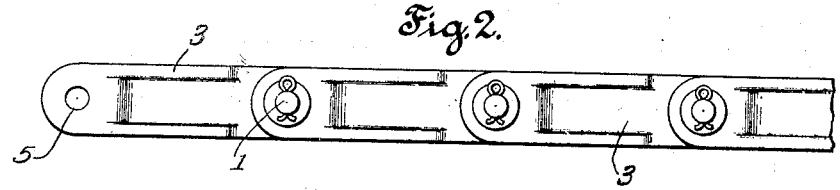
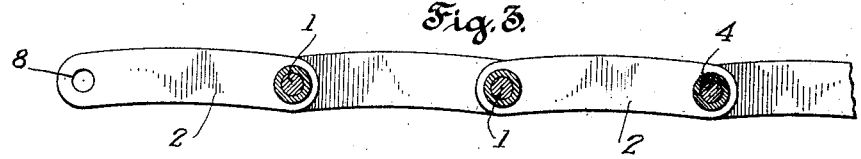
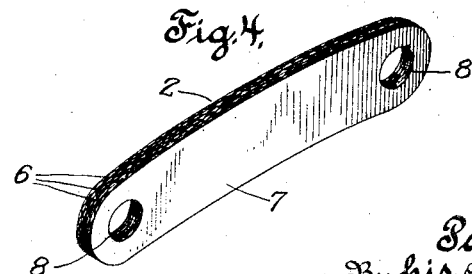
Inventor
Patrick H. Davis
By his Attorney
Wallace White Patented Jan. 9, 1923.

1,441,836

UNITED STATES PATENT OFFICE.

PATRICK HENRY DAVIS, OF LEONIA, NEW JERSEY, ASSIGNOR TO THE HAMILTON-LOW COMPANY, OF JERSEY CITY, NEW JERSEY, A CORPORATION OF NEW JERSEY.

CONVEYER BELT FOR DISHWASHING AND LIKE MACHINES.

Application filed July 28, 1922. Serial No. 578,037.

*To all whom it may concern:*

Be it known that I, PATRICK HENRY DAVIS, a citizen of the United States, residing at Leonia, in the State of New Jersey, United States of America, have invented new and useful Improvements in Conveyer Belts for Dishwashing and like Machines, of which the following is a specification.

My invention relates to dish-washing and like machines of the type in which the dishes are placed upon a link belt conveyer which carries them through the washing fluids. The principal objects of my invention are improvements in the conveyer belt, and in the dish-carrying links thereof, whereby the dishes are handled with less danger of breakage, without sacrificing the strength and wearing qualities of the belt, and without complicating the structure or increasing its cost of manufacture. A specific object of my invention is to provide a construction of belt in which certain of the links serve as dish-carrying links, and others as driving links, to carry the load of propelling the belt. A further object is to provide dish-carrying links of suitable, relatively soft, non-metallic material.

My invention consists in the construction, combination and arrangement of parts herein described and claimed, and illustrated in the accompanying drawings which show a preferred embodiment of the invention.

In these drawings, in which similar reference characters designate corresponding parts in all views, Fig. 1 is a plan view of a section of link belt embodying the invention;

Fig. 2 is a side elevation of a section of belt;

Fig. 3 is a section taken approximately on the line 3—3 of Fig. 1; and

Fig. 4 is a perspective view of a dish-carrying link.

Referring to these drawings, the link belt mechanism comprises a plurality of rods 1 arranged transversely, upon which are mounted dish-carrying links 2 and driving links 3 held in suitable laterally spaced relationship by sleeves or similar spacing devices 4 on the rods 1.

The driving links 3 are preferably of bronze, or other rustless metal suitable for carrying the driving load, and are perforated at each end as at 5 to receive the rods 1, the connection between the link and rod being a running fit. The driving links 3 are preferably arranged at each end of the rods 1, that is to say, at the sides of the conveyer belt, and if a wide conveyer is used, one or more intermediate rows of driving links may be used, as shown in Fig. 1.

The dish-carrying links 2, since they do not take the driving load, may be formed primarily with a view to reducing the chipping of dishes, and with this end in view I have found that they may be formed of layers of fabric 6 such as canvas, impregnated with a material 7 capable of rendering the link relatively rigid and waterproof, and able to withstand the heat of boiling water. Examples of such materials 7 are rubber vulcanized hard, or bakelite. These links are preferably made by preparing sheets comprising several layers of fabric 6 with the impregnating material 7, and then stamping out the links in the desired form, holes 8 being preferably simultaneously stamped at each end to fit the cross rods 1.

The operation of the machine is as heretofore, save that the force required to propel the conveyer is transmitted through the driving links 3, while the dishes and the like are supported by the dish-carrying links 2, and these dish-carrying links are freed from the driving load, and due to their special construction are easier on the dishes.

Having now described my invention I claim and desire to secure by Letters Patent:

1. A conveyer belt for washing machines comprising a plurality of supporting links comprising layers of fabric impregnated with water-proofing and stiffening material, cross members interconnecting and supporting said links, and stronger links associated with said cross members and adapted to take the driving load.

2. A conveyer belt for washing machines comprising soft supporting links, cross members interconnecting and supporting said links, and stronger links associated with said cross members and adapted to take the driving load.

3. A link for conveyer belts of washing machines comprising layers of fabric impregnated with waterproofing and stiffening material.

4. A link for conveyer belts of washing machines comprising layers of fabric impregnated with waterproofing and stiffening material and having holes punched therethrough to receive connecting members of the belt mechanism.

In testimony whereof I have signed my name to this specification.

PATRICK HENRY DAVIS.